US012703289B2

(12) United States Patent
Sandler et al.

(10) Patent No.: US 12,703,289 B2
(45) Date of Patent: Aug. 11, 2026

(54) CUSTOMIZABLE DUMP BODIES AND METHOD FOR MAKING THE SAME

(71) Applicant: Buyers Products Company, Mentor, OH (US)

(72) Inventors: Phillip Sandler, Mayfield Village, OH (US); Jeffery Warfield, Chardon, OH (US); Michael L. Davis, Jr., Painesville, OH (US)

(73) Assignee: Buyers Products Company, Mentor, OH (US)

( * ) Notice: Subject to any disclaimer, the term of this patent is extended or adjusted under 35 U.S.C. 154(b) by 412 days.

(21) Appl. No.: 18/461,245

(22) Filed: Sep. 5, 2023

(65) Prior Publication Data

US 2024/0140293 A1 May 2, 2024

Related U.S. Application Data

(60) Provisional application No. 63/381,749, filed on Oct. 31, 2022.

(51) Int. Cl.
*B60P 1/28* (2006.01)

(52) U.S. Cl.
CPC .................................... *B60P 1/286* (2013.01)

(58) Field of Classification Search
CPC .......... B60P 1/28; B60P 1/286; B62D 33/023; B62D 33/046
USPC ............................................ 296/183.1, 183.2
See application file for complete search history.

(56) References Cited

U.S. PATENT DOCUMENTS

| | | | | |
|---|---|---|---|---|
| 1,517,697 A * | 12/1924 | Barrett | B60P 1/28 296/10 |
| 2,140,590 A | 12/1938 | Meininger | |
| 2,910,322 A | 10/1959 | Magor | |
| 4,021,074 A | 5/1977 | Heiser | |
| 5,460,431 A | 10/1995 | McWilliams | |
| 5,681,095 A * | 10/1997 | Martin | B62D 33/02 220/691 |
| 6,375,250 B1 | 4/2002 | McWilliams | |
| 6,637,808 B1 | 10/2003 | Ling et al. | |

(Continued)

FOREIGN PATENT DOCUMENTS

| | | |
|---|---|---|
| CN | 209833455 U | 12/2019 |
| CN | 216101746 U | 3/2022 |
| DE | 202015106895 U1 | 3/2017 |

OTHER PUBLICATIONS

NPL1; Bedrock Truck Beds, “The QUAD Story”, https://www.youtube.com/watch?v =-RqethOSoNY (Date Posted: Jul. 27, 2022).

*Primary Examiner* — Jason S Daniels
(74) *Attorney, Agent, or Firm* — Emerson, Thomson & Bennett, LLC; Roger D. Emerson; Allison V. Trimble

(57) ABSTRACT

Provided is a customizable dump body for a vehicle, and a method of manufacturing and inventorying the components for manufacturing the same. The customizable dump body includes a bulkhead, a floor member with a terminal portion, two side panels, wherein at least one side panel has a mating surface, and wherein the side panel and mating surface are connected together. A customizable side panel assembly for a dump body for a vehicle may include a side panel having an outer side and an inner side, and a side panel rail, wherein the side panel rail is positioned on the outer side of the side panel.

17 Claims, 17 Drawing Sheets

(56) References Cited

U.S. PATENT DOCUMENTS

| | | | | |
|---|---|---|---|---|
| 8,550,542 | B1 * | 10/2013 | Booher | B62D 33/02 296/183.1 |
| 8,721,006 | B2 | 5/2014 | Uranaka | |
| 9,108,677 | B2 * | 8/2015 | Kerr | B62D 21/20 |
| 10,086,737 | B2 | 10/2018 | Lemaire et al. | |
| 11,358,539 | B2 * | 6/2022 | Tanudra | B60P 1/28 |
| 11,603,052 | B2 * | 3/2023 | Lagerskiöld | B60R 13/01 |
| 2006/0237992 | A1 | 10/2006 | Lemmons | |
| 2007/0057533 | A1 | 3/2007 | Lemmons | |
| 2008/0018135 | A1 | 1/2008 | Risner | |

* cited by examiner

CUSTOMIZABLE DUMP BODIES AND METHOD FOR MAKING THE SAME

This non-provisional utility application claims priority to U.S. Provisional Patent Application Ser. No. 63/381,749, filed on Oct. 31, 2022.

I. BACKGROUND

A. Technical Field

The present disclosure pertains to the field of custom dump body manufacturing, and more specifically to a method of inventory and assembling of dump body components to improve the cost, efficiency and assembly time for such dump bodies and the matching to the associated vehicle.

B. Description of Related Art

Purchasers of dump bodies often provide manufacturers of dump bodies with specific dimensions. Although the dimensions are often similar (i.e., for the floor area of the dump body), the volume dimensions can be different enough that each dump body is often a specially made, “one-off” design and manufacture. Specifically, various dump bodies can have different load capacities, based on the volume and thus weight that can be hauled on a specific vehicle frame. The volume and thus load capacity can be defined by the height of the side panels alongside the dump body.

Improvements in manufacturing set up costs, assembly time, cost, and delivery time would be possible if a degree of standardization could be obtained while retaining the customer’s preference for a custom design.

II. SUMMARY

Provided herewith is a customizable dump body for a vehicle. A bottom member defines a horizontal transport surface for retaining material transported within the dump body. A bulkhead defines a vertical rear support surface of the dump body. First and second side panels define vertical side support surfaces of the dump body and are attachable to mating surfaces on the bulkhead and the bottom member. The side panels are configured to attach to the mating surfaces at selected positions having a predetermined vertical height above the bottom member. A securement is provided for securing the first and second side panels to the bottom member and the bulkhead.

In one aspect, the bottom member includes a floor panel that defines the horizontal transport surface and first and second terminal portions vertically perpendicular to the floor panel. The terminal portions define the mating surfaces for the bottom member that receive the securement for securing the first and second side panels. The customizable dump body also includes first and second acute portions, each secured at an acute angle to both the floor panel and each respective terminal portion.

In another aspect, the first and second side panels each include a front post, an inner side, a back post, and a bulkhead side. The front post and back post provide vertical structure of a desired height, to result in a side panel having a suitable size to accommodate a selected custom dump body.

In yet another aspect, one or both of the side panels has a shape configured for being welded to the respective terminal portion and includes an inner side including a plurality of surfaces set at angles to each other to provide mechanical strength to the side panel. The inner side includes a first angled surface set at a sloped angle to a flat mating surface, and a second angled surface set an angle opposite to the first angled surface on an opposite side of the mating surface. A channel is formed in an inner surface defined by the second angled surface, a channel bottom surface parallel to the mating surface, and a third angled surface parallel to the first angled surface. The side panel also includes an outer side including a side panel rail having a generally flat top surface and a chamfer set at an angle to the top surface, wherein the top surface and the chamfer are configured so that material that falls on the side panel rail thereby falls outside of the dump body. The side panel can be configured such that the side panel rail includes a top of the side panel positioned at a vertically selectable lower or higher position to establish the predetermined vertical height of the mating surfaces above the bottom member. The side panel rail is positioned so that a distance between the bottom member and the side panel rail is between 30 inches and 36 inches. The side panel rail also includes a side panel rail flange for overlapping the side panel to selectively position the side panel rail at a predetermined vertical height along the side panel. A side panel rail securement is provided for securing the side panel rail flange to the side panel. An extension cap can be positioned over a top surface of the side panel rail to customize a height of the side panel.

In still another aspect, the bottom member can include a plurality of terminal portion apertures formed on the mating surfaces. The side panels each include a plurality of side panel apertures spaced at different heights. The terminal portion apertures are attached with the securement to respective side panel apertures at a respective corresponding height. The plurality of side panel apertures include first, second, and third side panel apertures associated with respective first, second, and third corresponding heights. The first side panel apertures are associated with a respective first height of 42 inches, the second side panel apertures are associated with a respective second height of 36 inches, and the third side panel apertures are associated with a respective third height of 30 inches.

In yet still another aspect, one or more frame components are provided upon which the dump body is secured to the vehicle. The securement can include either a plurality of welds or a plurality or nut and bolt fasteners.

In a further aspect, a method of customizing a dump body for a vehicle can be provided. A step is performed of providing a bottom member defining a horizontal transport surface for retaining material transported within the dump body, a bulkhead defining a vertical rear support surface of the dump body, and first and second side panels defining vertical side support surfaces of the dump body. This is followed by a step of positioning the side panels up or down until a desired height for the side panels with respect to the bottom member is reached. Then the side panels are secured to the bottom member resulting in a dump body having side panels positioned at a desired height. The step of securing can include either welding the side panels or fastening the side panels with nuts and bolts.

In accordance with one aspect of the present disclosure, elements of a dump body are manufactured in a standardized manner but assembled to create a custom dump body. The standardized elements are manufactured and inventoried with the efficiencies attendant to such standardization, but are assembled with a flexibility that allows the customer to custom order dimensions within a range, and enables the assembling of such standardized elements to efficiently create a dump body to the customer's desired preference.

In accordance with one aspect of the present disclosure, elements of a dump body are standardized, and manufactured in a standardized manner, but custom assembled to create a custom dump body. The standardized elements are manufactured and inventoried with the efficiencies associated with such standardization, but are assembled with at least one option that allows the customer to custom order dimensions within a range, and enables the assembling of such standardized elements to efficiently create a customized dump body to the customer's desired preference in a customized manner.

In accordance with another aspect of the present disclosure, elements of a dump body are manufactured in a standardized manner but assembled according to different options to create a custom dump body. The standardized elements are manufactured and inventoried with the efficiencies associated with such standardization, but are assembled with at least one option that allows the customer to custom order dimensions within a range, and enables the assembling of such standardized elements to efficiently create a dump body to the customer's desired preference.

In one aspect of the present disclosure, the customized body is permanently assembled into the customer's preferred custom dimensional design, such as by welding together different parts of the custom body. However, in another aspect of the present disclosure, the customized body is selectively assembled into the customer's preferred first custom dimensional design, with such assembly using selectively fastenable and unfastenable fasteners, such as bolts and nuts, or other fastening means, and then subsequently modified into the customer's second custom dimensional design, by selectively unfastening and fastening the fasteners.

In accordance with another aspect of the present disclosure, a customizable dump body for a vehicle includes a bulkhead, a floor member with a terminal portion, two side panels, wherein at least one side panel has a mating surface, and wherein the side panel and mating surface are welded together.

In accordance with another aspect of the present disclosure, a customizable side panel assembly for a dump body for a vehicle includes a side panel comprising an outer side and an inner side, a side panel rail, and wherein the side panel rail is positioned on the outer side of the side panel.

Still other benefits and advantages of this disclosure will become apparent to those skilled in the art to which it pertains upon a reading and understanding of the following detailed specification.

III. BRIEF DESCRIPTION OF THE DRAWINGS

The disclosure can take physical form in certain parts and arrangement of parts, embodiments of which will be described in detail in this specification and illustrated in the accompanying drawings which form a part hereof and wherein.

IV. DETAILED DESCRIPTION

Figure 1:
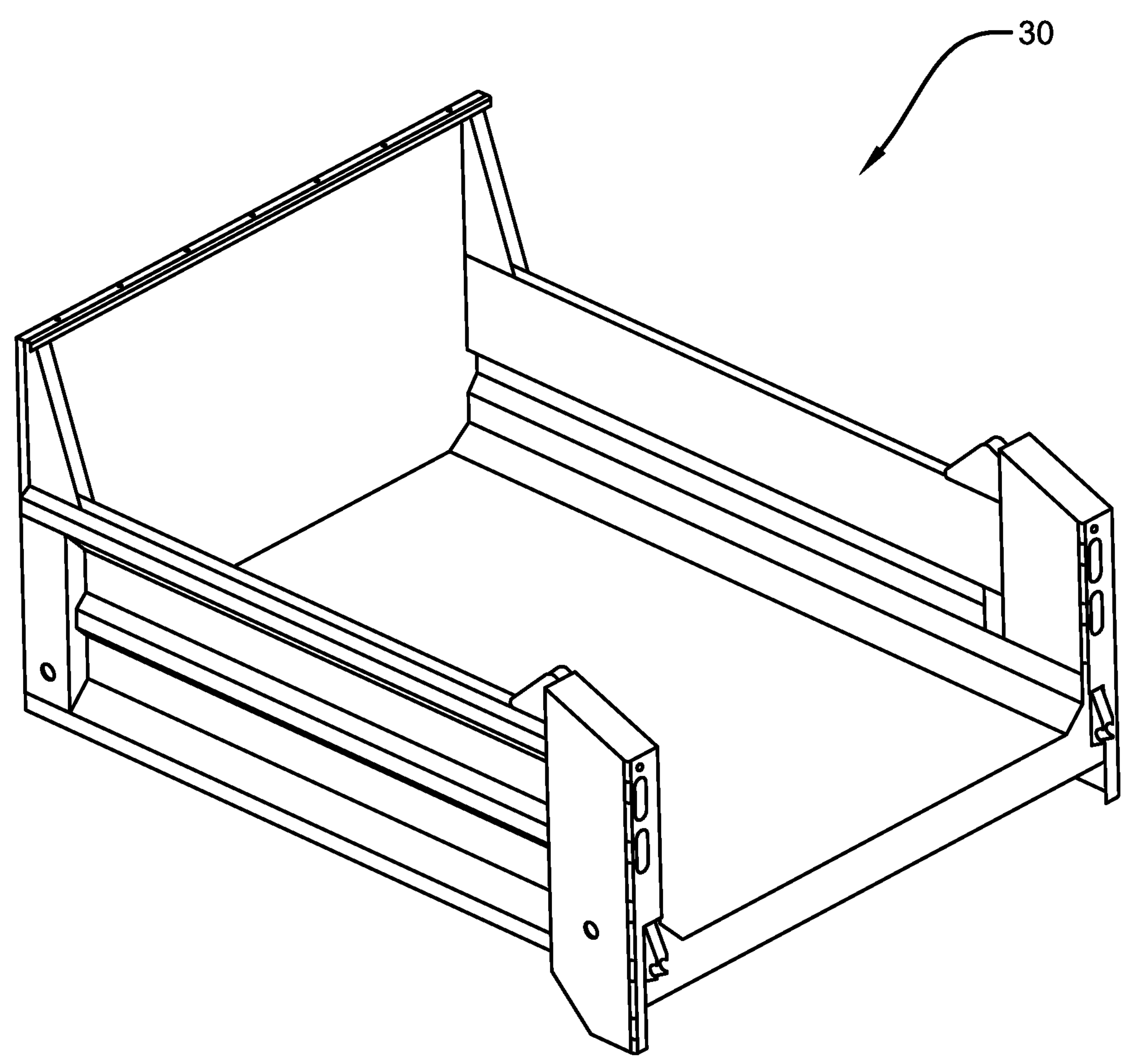
FIG. 1 is a perspective view of a dump body in accordance with an exemplary embodiment of the present disclosure.

Referring now to the drawings wherein the showings are for purposes of illustrating embodiments of the article only and not for purposes of limiting the same, and wherein like reference numerals are understood to refer to like components.

The present disclosure discloses a method of manufacture and related article that combines custom dump body manufacturing and mass manufacturing. Disclosed is a customizable dump body. The dump body may be adjustable. The dump body is assembled in a way that it can easily be modified, customizable and/or adjustable. So, a manufacturer can make the customizable dump body before receiving a customer's specifications and then customize the customizable dump body to the customer's specifications.

Referring now to the figures wherein the showings are for purposes of illustrating aspects of the disclosure only and not for purposes of limiting the same, and wherein like reference numerals are understood to refer to like components. FIG. 1 shows a dump body 30, which can be configured for use on a vehicle such as a truck for hauling and dumping material. Further, the dump body 30 can be used as a trailer dump body. The dump body 30 and its subassemblies can be made of stainless steel, carbon steel, aluminum, composite, polymer, or other materials chosen with sound engineering judgment. Unless stated otherwise in this disclosure, parts and sub-assemblies are attached through welding, bolting, or gluing. Other attachment methods can include bolting, riveting, or use of adhesive (depending on the application) chosen with sound engineering judgment.

Figure 2:
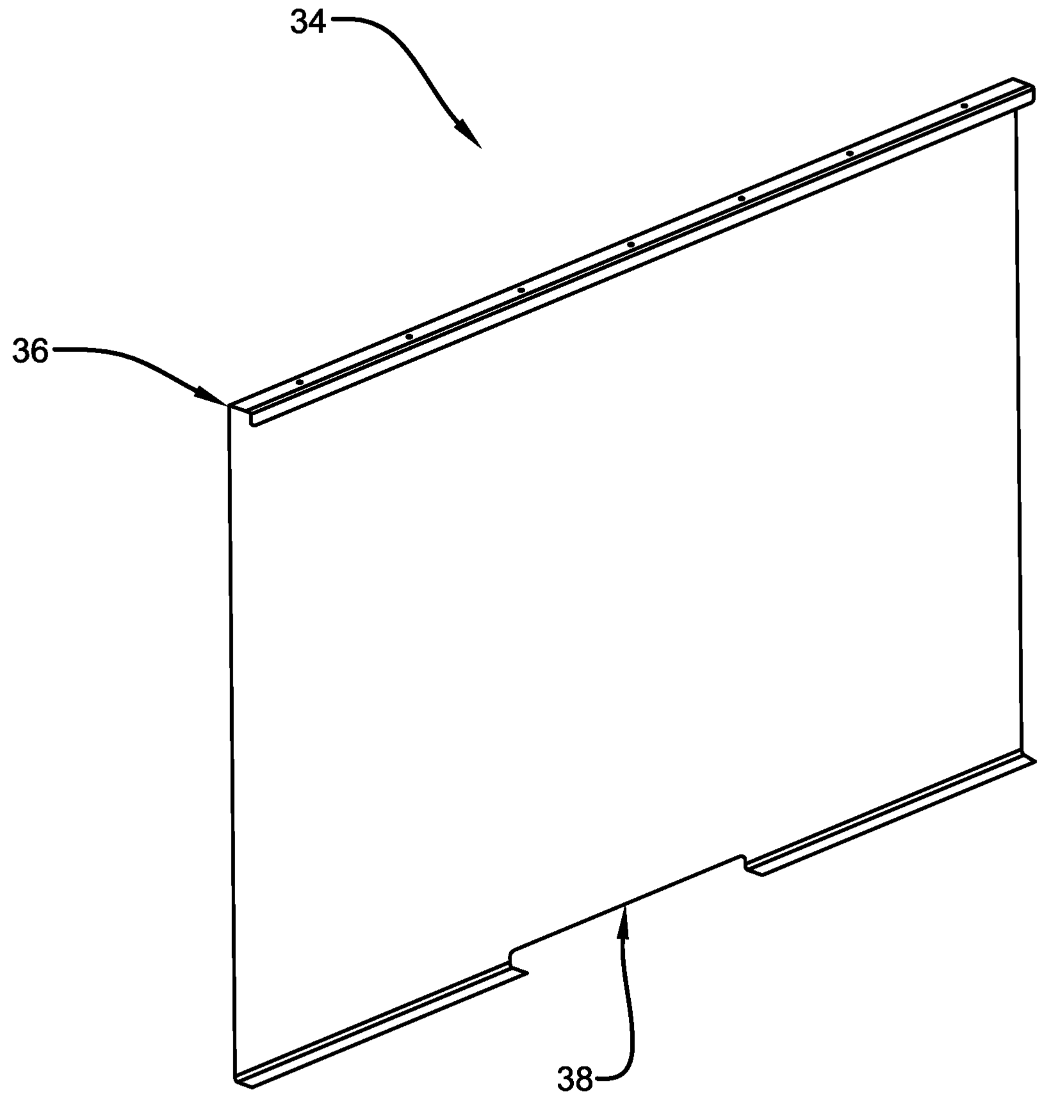
FIG. 2 is a perspective view of a bulkhead in accordance with an exemplary embodiment of the present disclosure.

Referring to FIG. 2, a bulkhead 34 defines a vertical rear support surface of the dump body 30. The bulkhead 34 can have a bulkhead lip 36 at the top portion of it. The bulkhead lip 36 can be curved towards the dump body 30 and away from the cab of the vehicle. The bulkhead 36 can have a cut out 38. In one aspect, the bulkhead 34 is vertically adjustable in a plane, perpendicular to the floor panel 42. In an alternative embodiment, the bulkhead 34 may be separated into two or more pieces to allow improved workability with the size of the sheets of metal used to manufacture the bulkhead 34.

Figure 3:
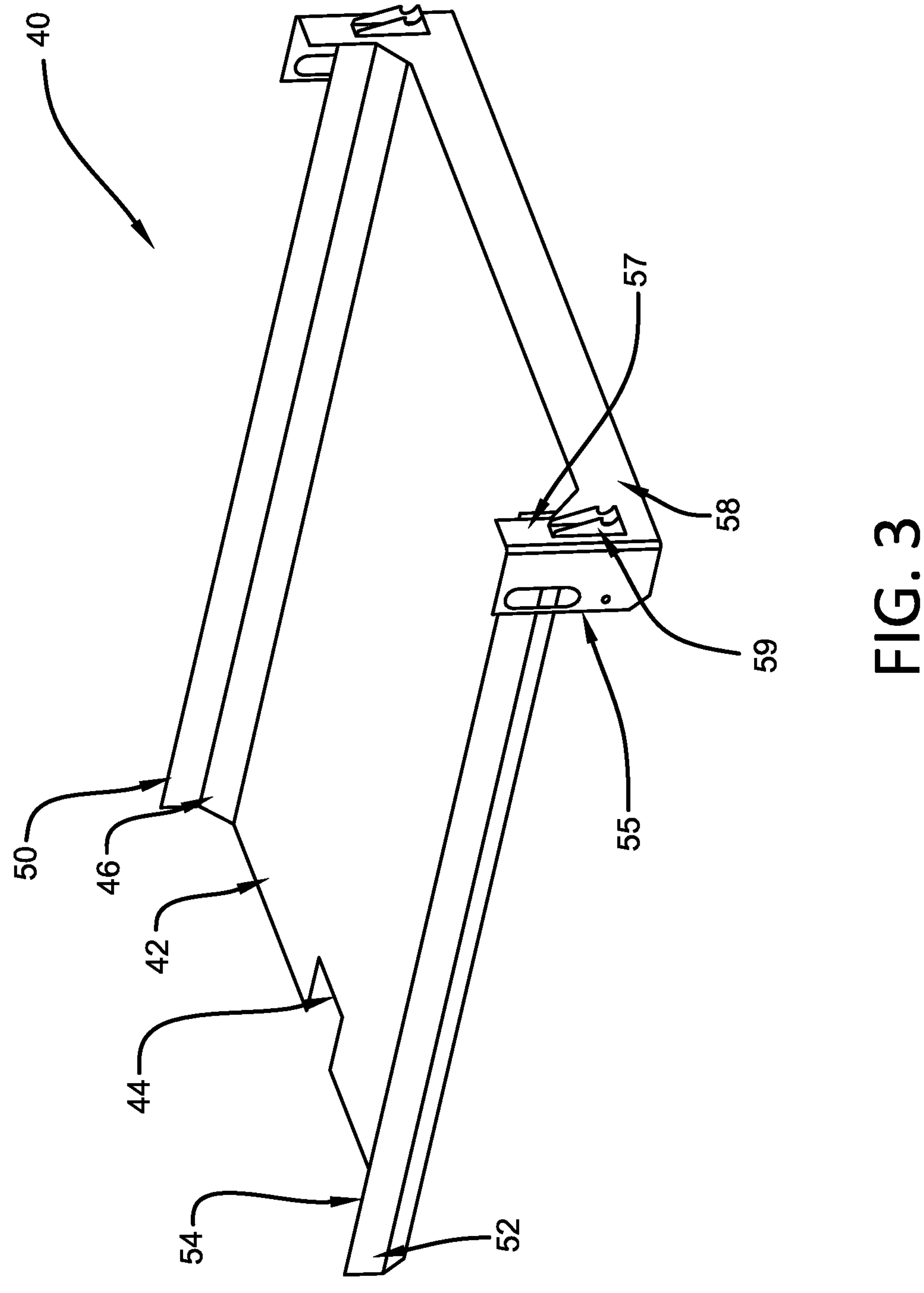
FIG. 3 is a perspective view of a bottom member in accordance with an exemplary embodiment of the present disclosure.

Referring to FIG. 3, a bottom member 40 includes a horizontal transport surface for retaining material transported within the dump body 30. The bottom member 40 can include a floor panel 42, a pair of acute portions 46 (also referred to as acute side portions), and a pair of terminal portions 50 (also referred to as terminal side portions). The floor panel 42 includes the horizontal transport surface of the bottom member 40. First and second terminal portions 50 are positioned vertically perpendicular to the floor panel 42. The terminal portions 50 include the mating surfaces for the bottom member 40 that receive securement for securing the first and second side panels as discussed in greater detail below.

With further reference to FIG. 3, each of the first and second acute portions 46 is attached in such a manner as to make an acute angle between the floor panel 42 and a terminal portion 50, such that the terminal portion 50 is preferably perpendicular to the floor panel 42 with the acute portion 46 spanning an angle therebetween. However, it can be contemplated that the terminal portion 50 can be directly connected to the floor panel 42 without an acute portion 46, without departing from the invention. As depicted, there are a pair of terminal portions 50 and respective acute portions 46 along respective first and second opposite side edges of the floor panel 42. The floor panel 42 can have a cut out 44 along a first edge which is essentially a void area removed from the floor panel 42. The cut out 44 is shown to be square but it can be of any desired shape without departing from the invention. The cut out 44 can be specially sized to allow a piston from a hoist lift to pass through it, and suitably shaped to conform to the hoist life, allowing some portion for clearance. The terminal portion 50 can have an outside surface 52 facing outwardly away from the dump body 30 and a top surface 54 facing inwardly toward the dump body 30. In an alternative embodiment, the bottom member 40 may be separated into two or more pieces allowing improved workability with the size of the sheets of metal used to manufacture the bottom 40. In an alternate embodiment, floor panel 42 is planar and flat, and can be welded or otherwise attached to side panel 60, as shown in FIG. 6A.

With further reference to FIG. 3, in one or more aspects of this disclosure, attached to the rear side of the bottom member 40 is a back panel 55. As shown herein, the back panel 55 can be essentially parallel and abutting the terminal portion 50. The back panel 55 can have at least one tailgate flange 57, formed perpendicular to the back panel 55 and substantially abutting an end of the terminal portion 50. Attached to and formed integrally with the tailgate flange 57 is an aperture flange 58, extending along a second edge of the floor panel 42 opposite the first edge having the cut out 44, and spanning the opposing terminal portions 50. There are actually first and second back panels 55 and tailgate flanges 57 associated with respective opposing terminal portions 50. Attached to each tailgate flange 57 is a tailgate hook 59 for engaging a tailgate hinge. Each tailgate flange 57 can have more than one tailgate hook 59.

Figure 4:
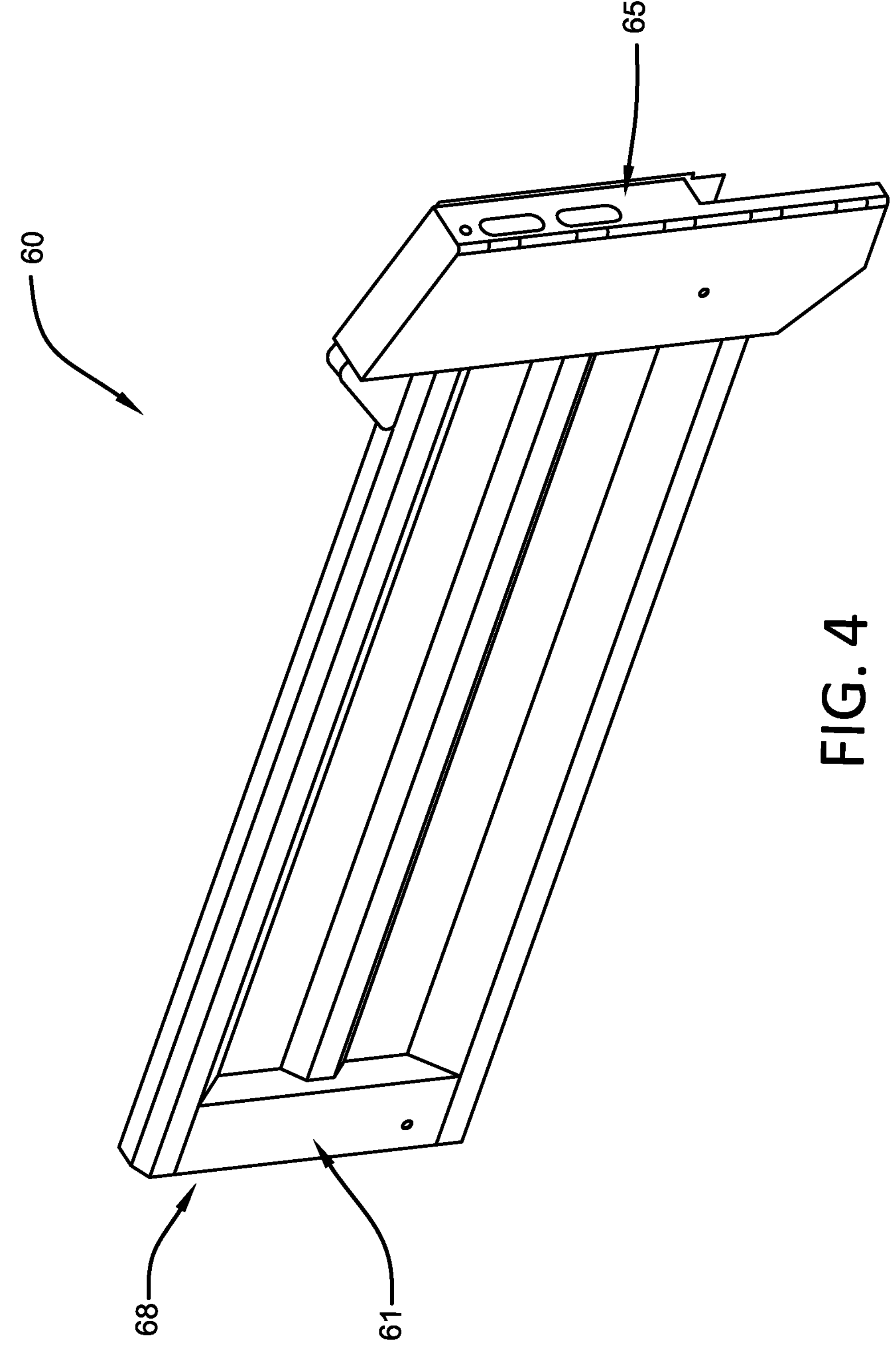
FIG. 4 is a perspective view of a side panel in accordance with an exemplary embodiment of the present disclosure.

Referring to FIG. 4, first and second side panels 60 are provided to define vertical side support surfaces of the dump body 30. The side panels 60 are attachable to mating surfaces on the bulkhead and the bottom member 40. The side panels 60 are configured to attach to the mating surfaces at a selected position having a predetermined vertical height above the bottom member, as explained in greater detail hereinbelow. A securement is provided for securing the first and second side panels 60 to the bottom member 40 and the bulkhead 34. The securement can include welding or fasteners, as also explained in greater detail hereinbelow. As illustrated, the first and second terminal portions 50 extend vertically perpendicular to the floor panel, such that terminal portions 50 define the mating surfaces for the bottom member 40 that receive the securement for securing the first and second side panels 60.

In an embodiment shown in FIG. 4, each side panel 60 can have a front post 61, an inner side 64 (not shown in this figure but shown in FIG. 5, described hereinbelow), a back post 65, and a bulkhead side 68. The front post 61 and back post 65 provide vertical structure of a desired height, to result in a side panel 60 having a suitable size to accommodate a selected custom dump body 30.

Figure 5:
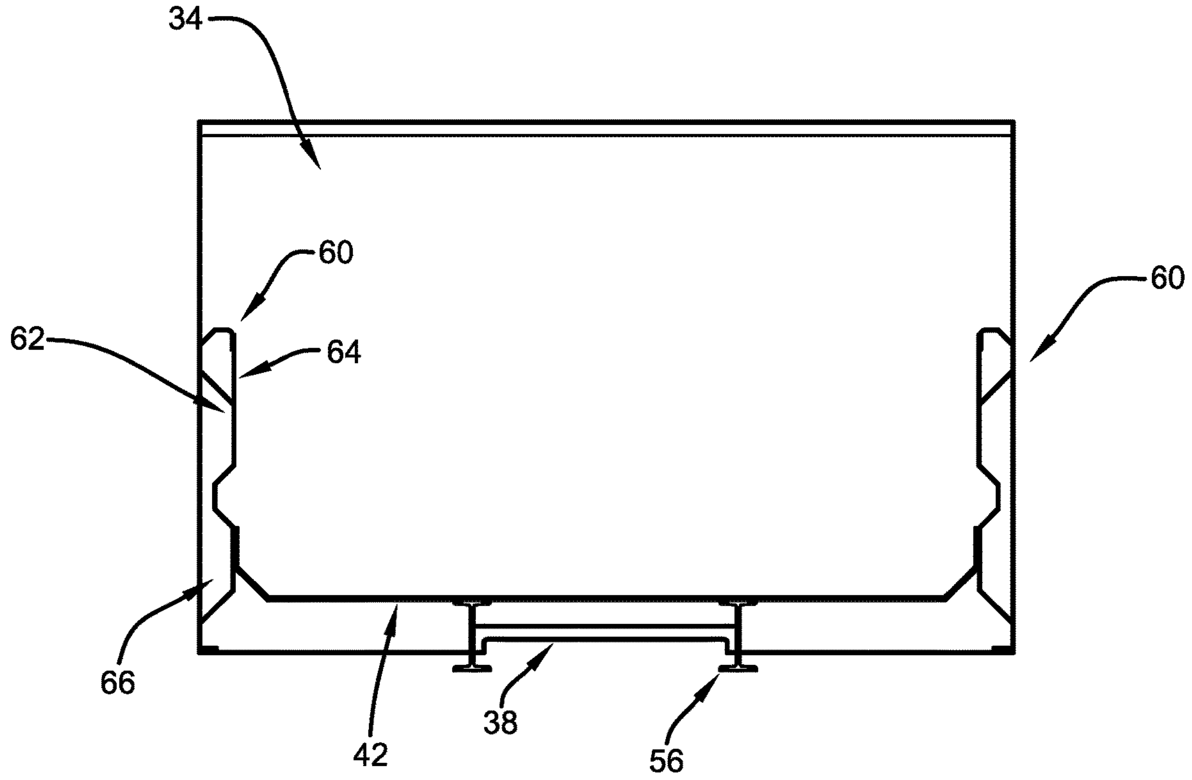
FIG. 5 is a rear view of a dump body in accordance with an exemplary embodiment of the present disclosure.

Referring to FIG. 5, this figure shows a diagram of the inside of the dump body 30 facing the direction of bulkhead 34. The dump body 30 can be assembled to have two side panels 60 of a selected height to accommodate different custom designed load capacities, mounted at opposite sides of the floor panel 42. FIG. 5 shows a frame component or frame 56, upon which dump body 30 can rest. This disclosure contemplates one or more frame components 56 which are components of the vehicle and can vary in accordance with a variety of different types of vehicles, as would be appreciated by those of skill in the art. The assembled dump body 30 can have two side panels 60, one each for the driver and passenger sides of the dump body 30. The driver side panel 60 and the passenger side panel 60 may be identical. FIG. 5 also shows outer side 62 of side panel 60, an inner side 64 of the side panel 60, and a tailgate side 66 of the side panel 60. Alternatively, a one-piece side panel without an outer side 62 or an inner side 64 may also be utilized.

Figure 6:
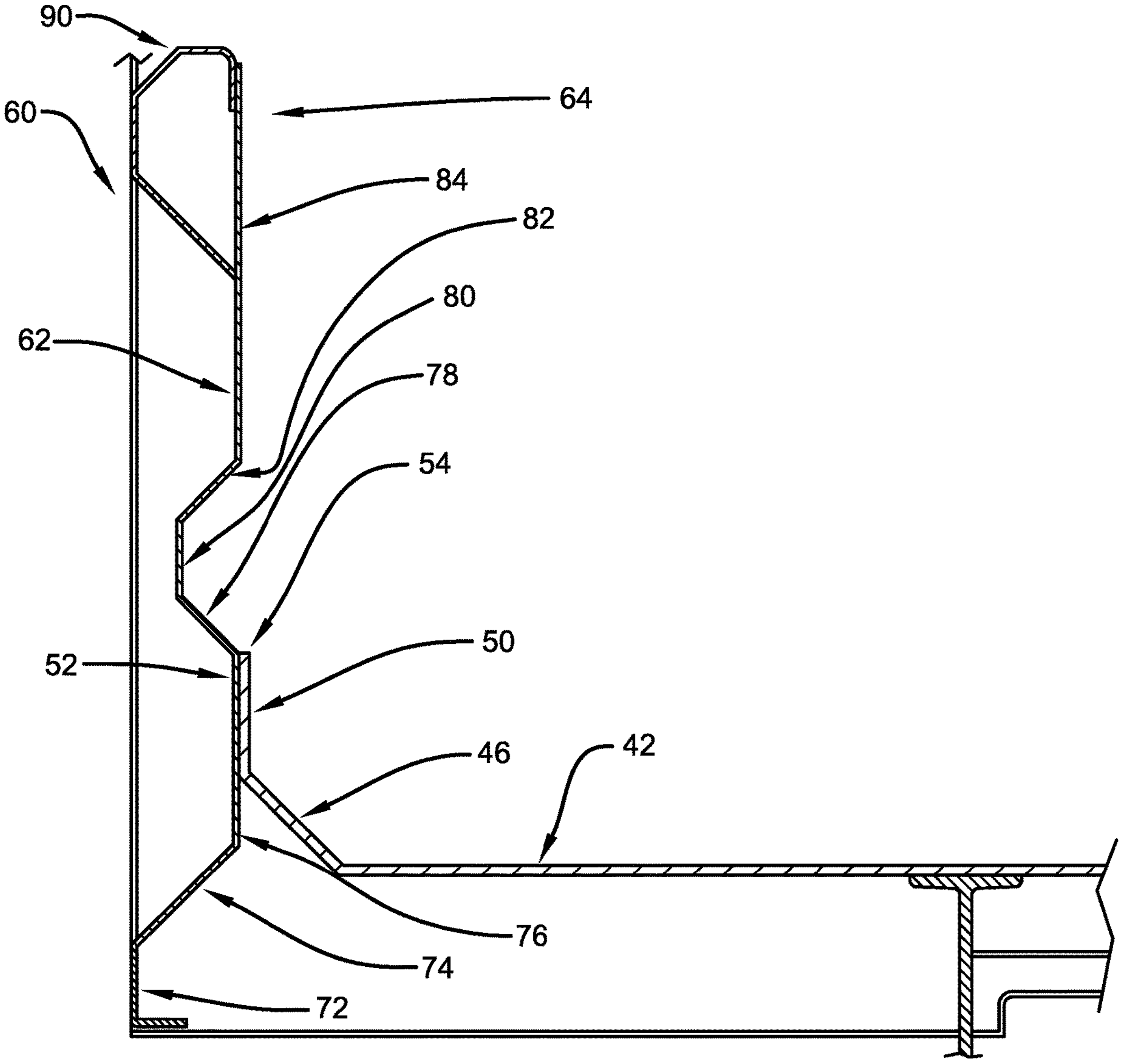
FIG. 6 shows a concentrated view of the connection between a terminal portion and a side panel in accordance with an exemplary embodiment of the present disclosure.
Figure 6A:
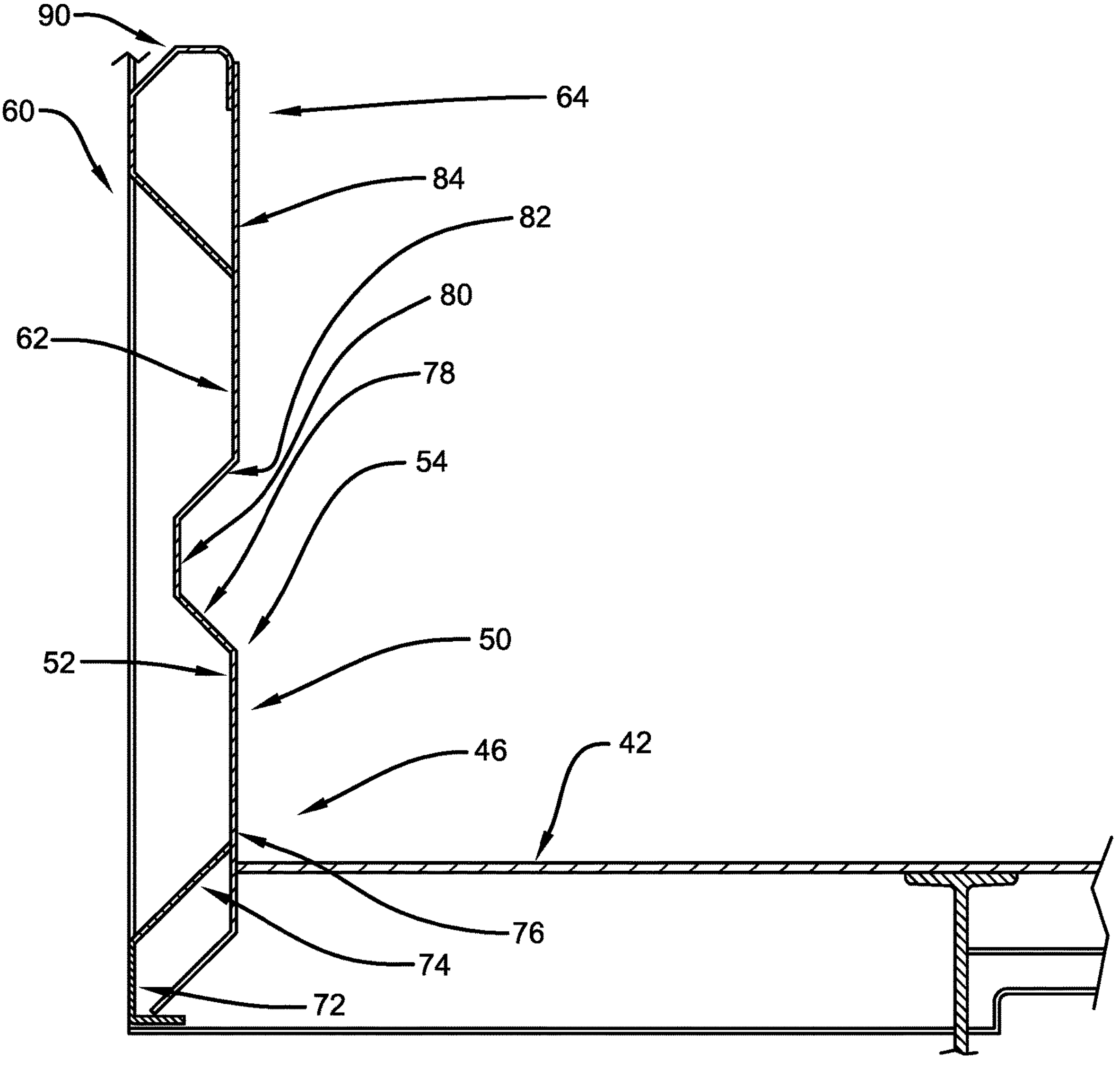
FIG. 6A shows an exemplary embodiment where the bottom member 60 and/or floor panel 42 is flat.
Figure 7:
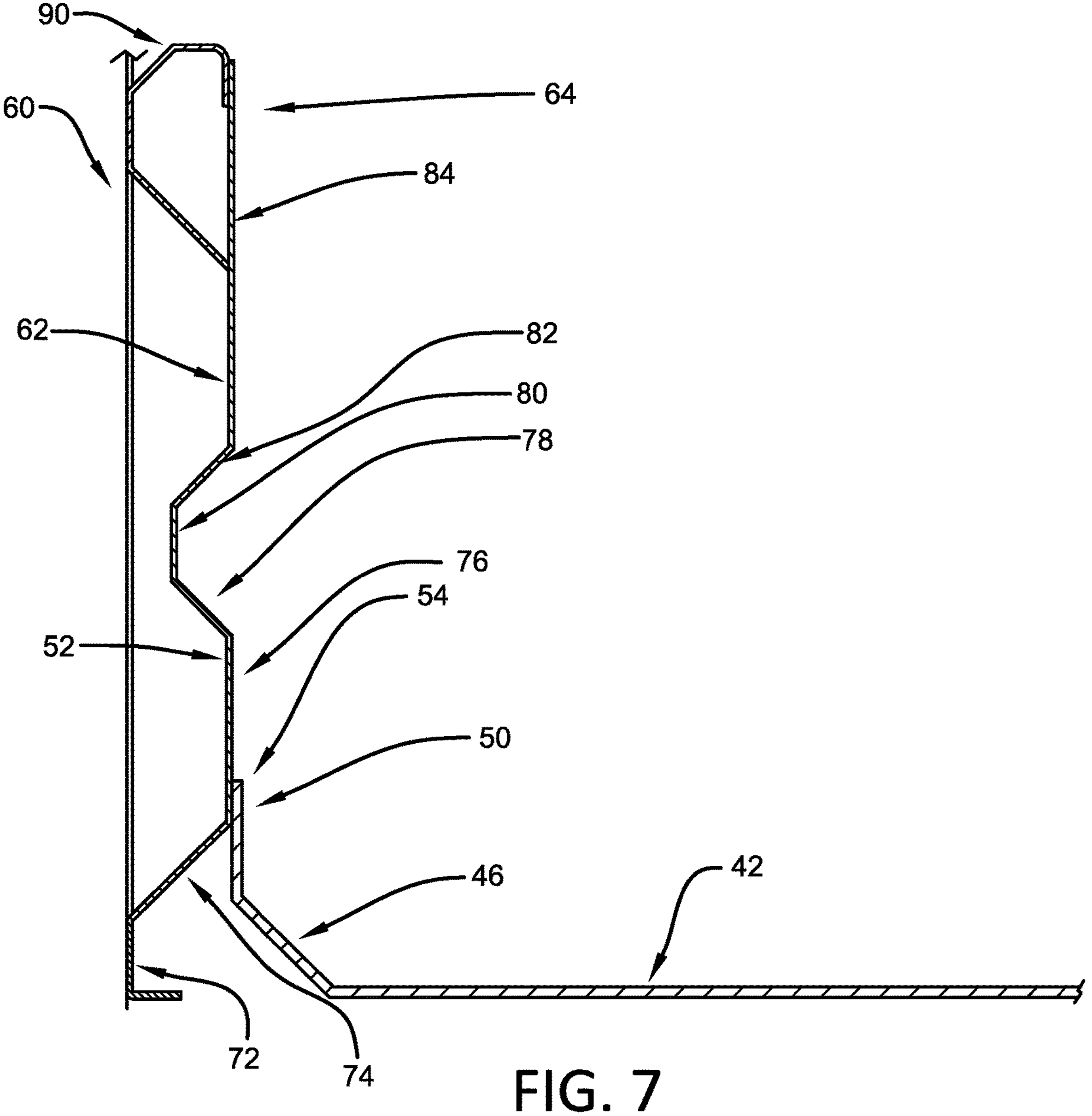
FIG. 7 shows a concentrated view of the connection between the terminal portion and the side panel where at least some of the terminal portion does not touch a mating surface of the side panel, in accordance with an exemplary embodiment of the present disclosure.

Referring to FIGS. 6 and 7, this figure shows the same view as FIG. 5 but zoomed in on the connection between the terminal portion 50 and the side panel 60. In one or more aspects, the side panel 60 may have a shape specially adapted for being welded to the terminal portion 50. An inner side 64 of the side panel 60 can have an L-shaped portion 72 at a bottom. The inner side 64 includes a variety of surfaces set at angles to each other to provide mechanical strength to the overall structure. Thus, the inner side 64 includes a first angled surface 74 set at a sloped angle to a flat mating surface 76. A second angled surface 78 is set an angle opposite to the first angled surface 74 but on the opposite side of the mating surface 76. A channel is formed in the inner surface 64, defined by the second angled surface 78, a channel bottom surface 80 parallel to the mating surface, and a third angled surface 82, which can be parallel to the first angled surface 74. An upper surface 84 is next to the channel and can be parallel or coplanar with the mating surface 76. The L-shaped portion 72 is bent and can help to deflect objects and debris from going under the dump body 30. Positioned on an outer side 62 of the side panel 60 is a side panel rail 90, which functions as the top of the side panel 60.

In one or more aspects, the terminal portion 50 is welded to the mating surface 76. In one or more aspects, the following method can be employed to do this. Positioning the terminal portion 50 next to the mating surface 76 and creating a weld at the junction of the top surface 54 of the terminal portion 50 and the mating surface 76. The terminal portion 50 can be attached to the mating surface 76 through any suitable manner other than welding such as using bolts and nuts.

In one or more aspects of this disclosure, the terminal portion 50 is welded to the top portion of the mating surface 76. This is shown in FIG. 6. In this aspect, the floor portion 42 can be vertically higher than the L-shaped portion 72, or, in this aspect the floor portion 42 can be vertically higher than the first angle surface 74. When the terminal portion 50 is welded to the top portion of the mating surface 76, the floor portion 42 can be above the L-shaped portion 72 by six inches. In one or more aspects, the terminal portion 50 is welded onto the top third of the mating surface 76. In one or more aspects, the distance from the floor panel 42 to the top of the side panel rail 90 is 30 inches. In one or more aspects, the terminal portion 50 is welded onto the bottom third of the mating surface 76. This is shown in FIG. 7. In one or more aspects, the terminal portion 50 is welded onto the mating surface 76 in a position so that at least some of the terminal portion 50 does not touch the mating surface 76. This is shown in FIG. 7. In one or more aspects, the distance from the floor panel 42 to the top of the side panel rail 90 is 36 inches. The innovative design of the bottom member 40 and the side panel 60 allows a manufacturer to make a dump body 30 with different heights for its sides by using only a single type of side panel 60.

Figure 8:
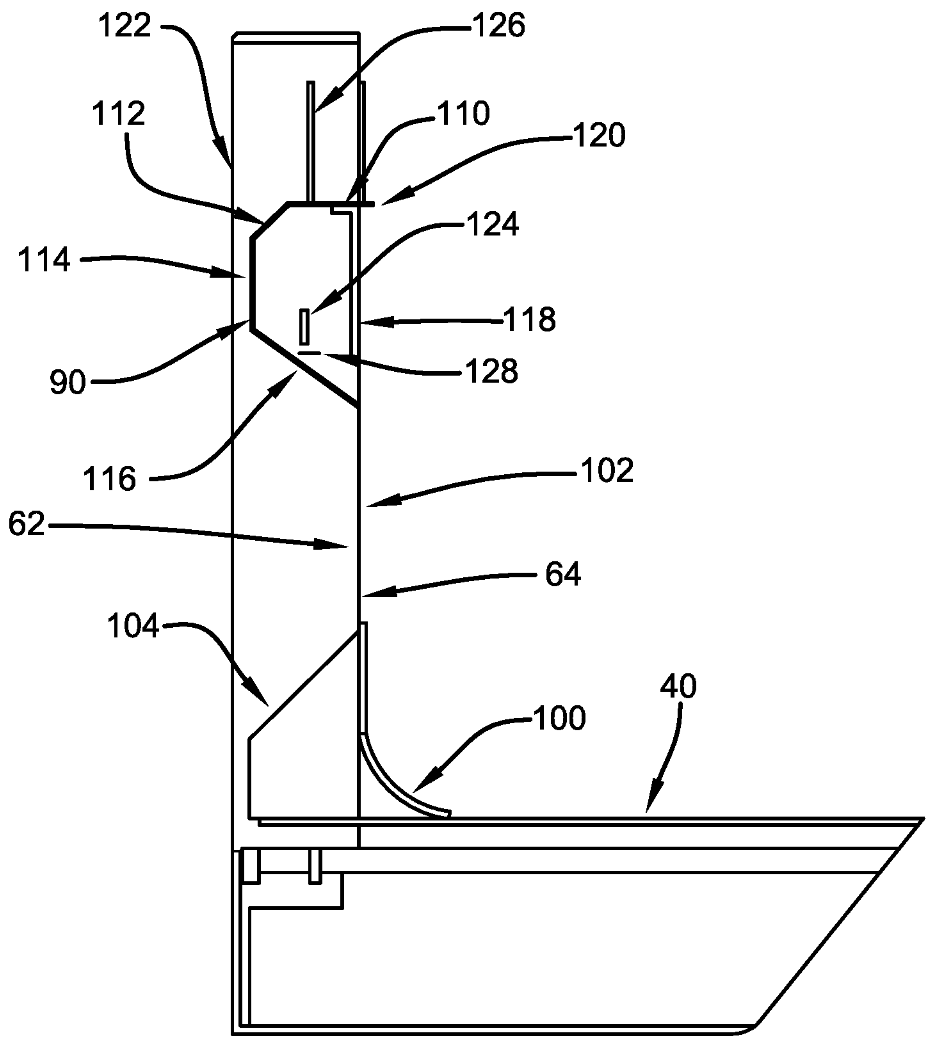
FIG. 8 is a rear view of the side panel in accordance with an exemplary embodiment of the present disclosure.

Referring to FIG. 8, this figure shows another aspect of the side panel 60 and the bottom member 40. In one or more aspects of this disclosure, the inner side 64 of the side panel 60 has a panel surface 102 and a lower panel portion 104. The lower panel portion 104 is attached to the bottom member 40.

With further reference to FIG. 8, in one or more aspects of this disclosure, the dump body 30 may have a curved piece 100 (also referred to as a curved member) to create a slope between panel surface 102 and bottom member 40. The curved member 100 may run all or part of the length of the bottom member 40 and the panel surface 102.

With continuing reference to FIG. 8, in one or more aspects of this disclosure, positioned on the outer side 62 of the side panel 60 is a side panel rail 90. In one or more aspects of this disclosure, the side panel rail 90 can have a generally flat top surface 110 of the side panel rail 90, and a chamfer 112 set at an angle to the top surface 110. An outer surface 114 of the side panel rail 90 is generally perpendicular to the top surface 110. A bottom surface 116 of the side panel rail 90 is set an angle to the outer surface 114. An inner surface 118 of side panel rail 90 is parallel and opposite to the outer surface 114. The top surface 110 of the side panel rail 90 and the chamfer 112 are advantageously shaped so that material that falls on the top of the side panel rail 90 and thereby falls outside of the dump body 30.

Figure 9:
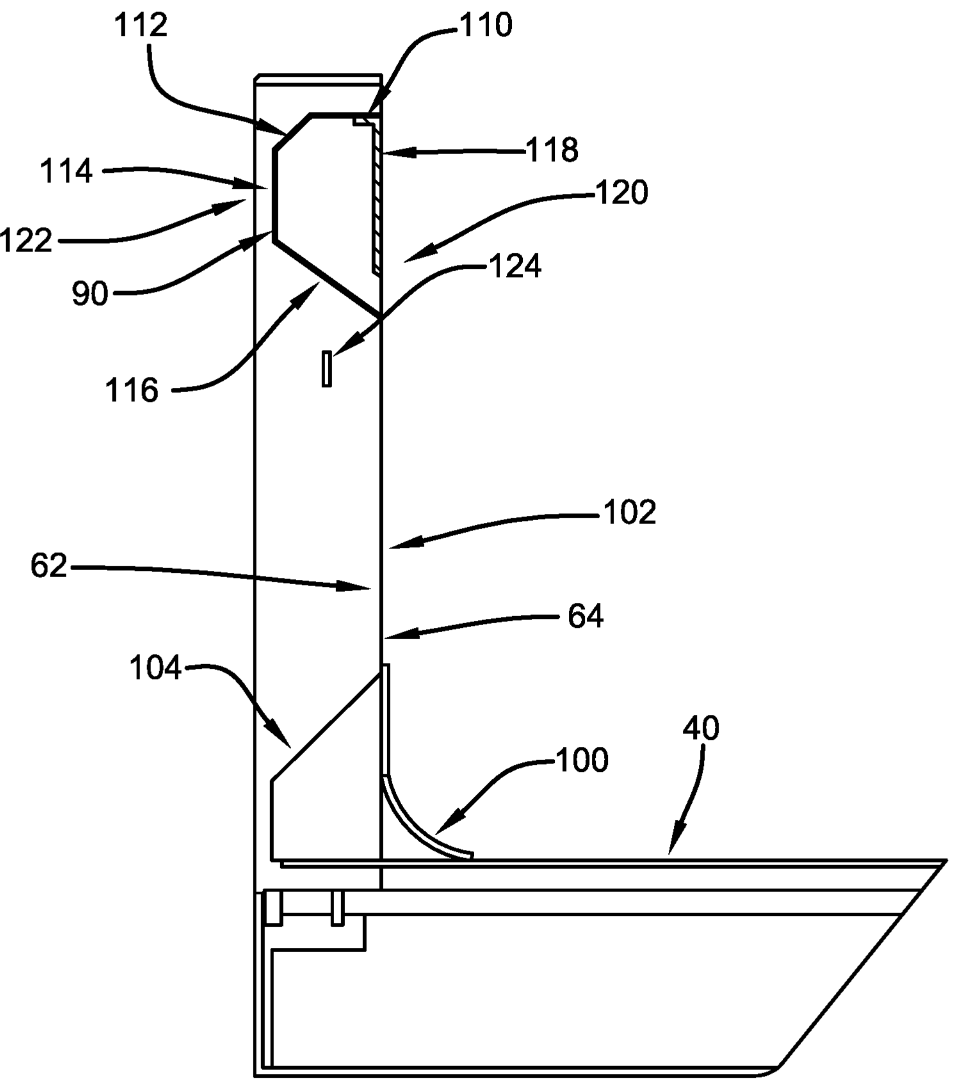
FIG. 9 is a rear view of the side panel where a side panel rail is in a higher position than its position as shown in FIG. 8, in accordance with an exemplary embodiment of the present disclosure.

Referring to FIGS. 8 and 9, the side panel rail 90 can be positioned so that it functions as the top of the side panel 60. The side panel rail 90 can be positioned at a vertically selectable lower or higher position to establish the predetermined vertical height of the mating surfaces above the bottom member. For example, FIG. 8 shows the side panel rail 90 in a lower position, and FIG. 9 shows the side panel rail 90 in a higher position. In one or more aspects of this disclosure, the side panel rail 90 is positioned so that the distance between the floor member 40 and the top of the side panel rail 90 is 30 inches. This is shown in FIG. 8. In one or more aspects of this disclosure, side panel rail 90 is positioned so that the distance between floor member 40 and the top of the side panel rail 90 is 36 inches. This is shown in FIG. 9. The innovative design of the side panel rail 90 and the outer side 62 of the side panel 60 allows a manufacturer to make a dump body 30 with different heights for its sides by using only a single length of side panel 60 and a single side panel rail 90.

With further reference to FIGS. 8 and 9, the side panel rail 90 can be attached to the outer side 62 of the side panel 60, and can be attached through welding, bolting, fastening, or any other suitable technique. The side panel rail 90 can be welded to the inner side 64 of the side panel 60 via either a weld at the top surface 110 of the side panel rail 90 or a weld at the inner surface 118 of the side panel rail 90 and the top end 120 of the inner side 64 of the side panel 60. In one or more aspects of this disclosure, the side panel 60 has a lower peg 124 and an upper peg 126. The lower peg 124 and the upper peg 126 extend in the longitudinal direction along the length of the side panel 60. The side panel rail 90 can have one or more rail channels 128 for accepting the lower peg 124, the upper peg 126, or both.

The following is a method for manufacturing the side panel 60 with different heights: positioning the side panel rail 90 on the outer side 62 of the side panel 60, moving the side panel rail 90 up or down until the desired height for the side panel 60 is reached, and welding the side panel rail 90 to the outer side panel 62 of the side panel 60. In one or more aspects of this disclosure, the weld can be located on different places on the side panel rail 90 such as the top surface 110 of the side panel rail 90 or the inner surface 118 of the side panel rail 90.

Figure 10:
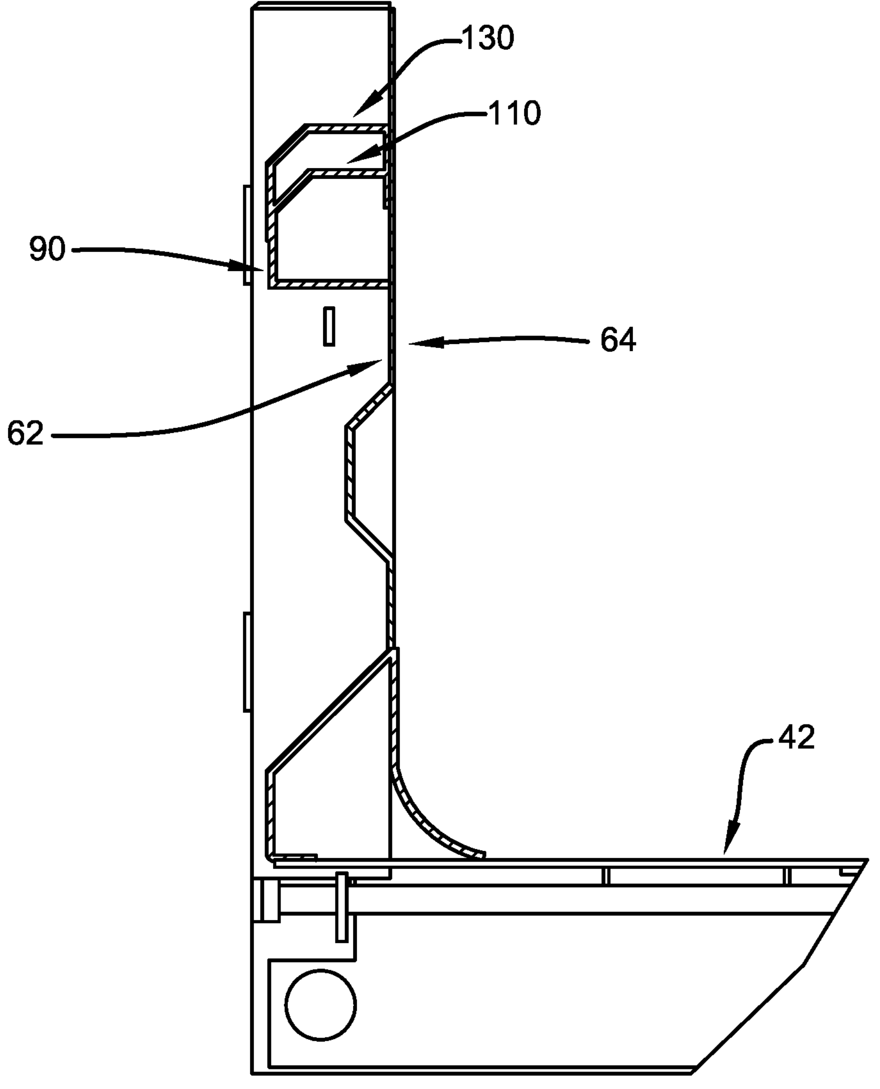
FIG. 10 is a rear view of the side panel and an extension cap in accordance with an exemplary embodiment of the present disclosure.

Referring to FIG. 10, this figure shows an extension cap 130 placed on top of the side panel rail 90. In one or more aspects of this disclosure, the distance from the floor panel 42 to the top surface 110 of the side panel rail 90 is 30.4 inches, and with the extension cap 130 the distance from the floor panel 42 to the top of the extension cap 130 is 32.4 inches. By using the extension cap 130, a manufacturer can further customize the height of the side panel 60. The extension cap 130 can be welded or otherwise attached to the inner side 64 of the side panel 60 and the side panel rail 90.

Figure 11:
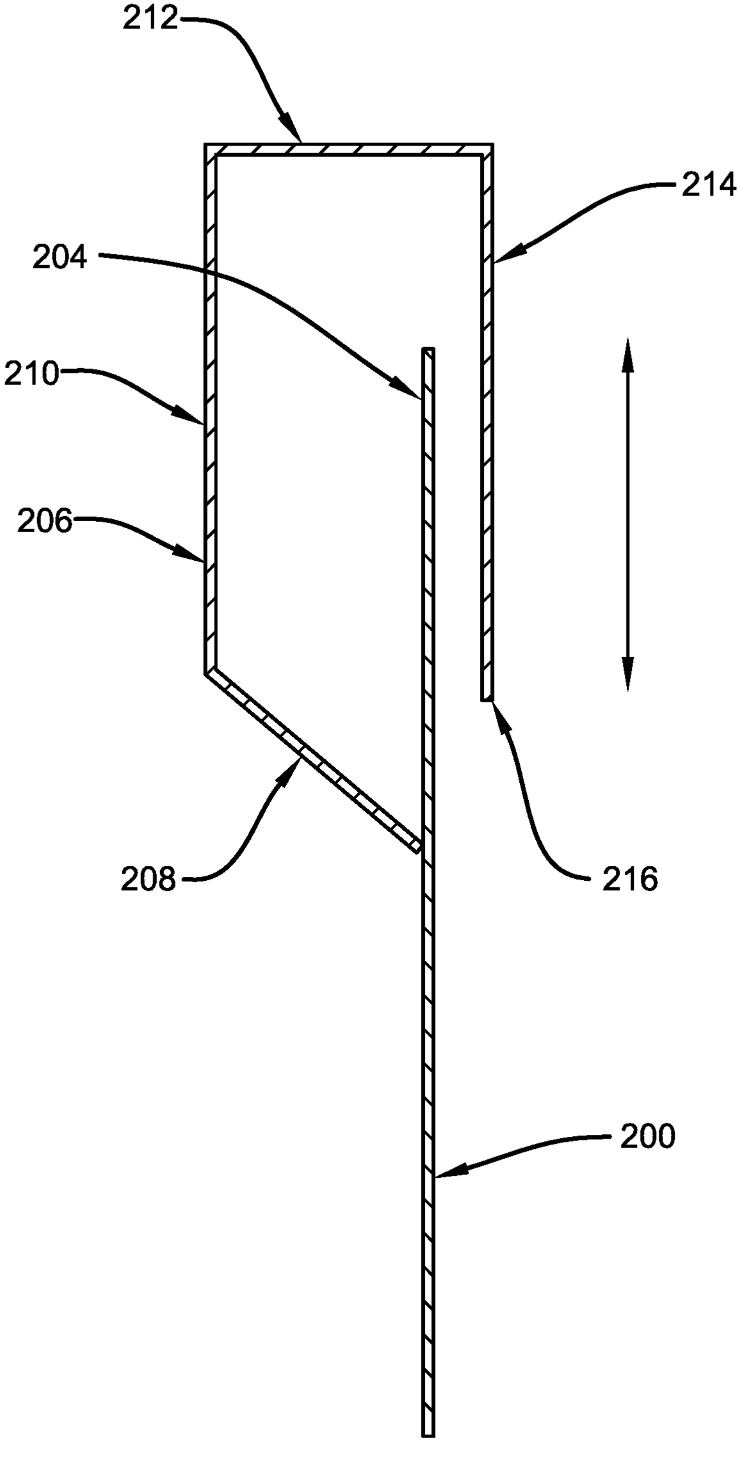
FIG. 11 is a rear view of a side panel and side panel rail in accordance with another exemplary embodiment of the present disclosure.

Referring to FIG. 11, this figure shows the side panel 200 and the side panel rail 206. In one or more aspects of this disclosure, the side panel 200 has a top 204 of the side panel 200. In one or more aspects of this disclosure, the side panel rail 206 has a bottom surface 208 of the side panel rail 206, along with an outer surface 210 of the side panel rail 206, a top surface 212 of the side panel rail 206, and a side panel rail flange 214. The innovative design of the side panel 200 and the side panel rail 206 allows a manufacturer to slide the side panel rail 206 higher or lower to achieve a custom side panel height. Once the side panel rail 206 is adjusted to the desired height, a manufacturer can place a securement such as a weld at the junction of the lower portion 216 of the side panel rail flange 214 and the top 204 of the side panel rail 200. The following is a method for attaching the side panel 200 to the side panel rail 206: positioning the top 204 of the side panel 200 inside of the side panel rail 206 so that the top 204 of the side panel rail 200 overlaps with the side panel rail flange 214 and creating a weld at the lower portion 216 of the side panel rail flange 214 and the top 204 of the side panel 200. This overlap relation is shown in FIG. 11. The positioning step can include positioning the side panel rail 206 at a predetermined vertical height along the side panel 200 so that the side panel 200 is selectively positioned inside of the side panel rail 206 instead of the previously described positioning step.

Referring to FIG. 11, this figure shows the side panel 200 and the side panel rail 206. In one or more aspects of this disclosure, the side panel 200 has a top 204 of the side panel 200. In one or more aspects of this disclosure, the side panel rail 206 has a bottom surface 208 of the side panel rail 206, along with an outer surface 210 of the side panel rail 206, a top surface 212 of the side panel rail 206, and a side panel rail flange 214. The innovative design of the side panel 200 and the side panel rail 206 allows a manufacturer to slide the side panel rail 206 higher or lower to achieve a custom side panel height. Once the side panel rail 206 is adjusted to the desired height, a manufacturer can place a securement such as a weld at the junction of the lower portion 216 of the side panel rail flange 214 and the top 204 of the side panel rail 200. The following is a method for attaching the side panel 200 to the side panel rail 206: positioning the top 204 of the side panel 200 inside of the side panel rail 206 so that the top 204 of the side panel rail 200 overlaps with the side panel rail flange 214 and creating a weld at the lower portion 216 of the side panel rail flange 214 and the top 204 of the side panel 200. This overlap relation is shown in FIG. 11. The positioning step can include positioning the side panel rail 206 at a predetermined vertical height along the side panel 200 so that the side panel 200 is selectively positioned inside of the side panel rail 206 instead of the previously described positioning step.

Figure 12:
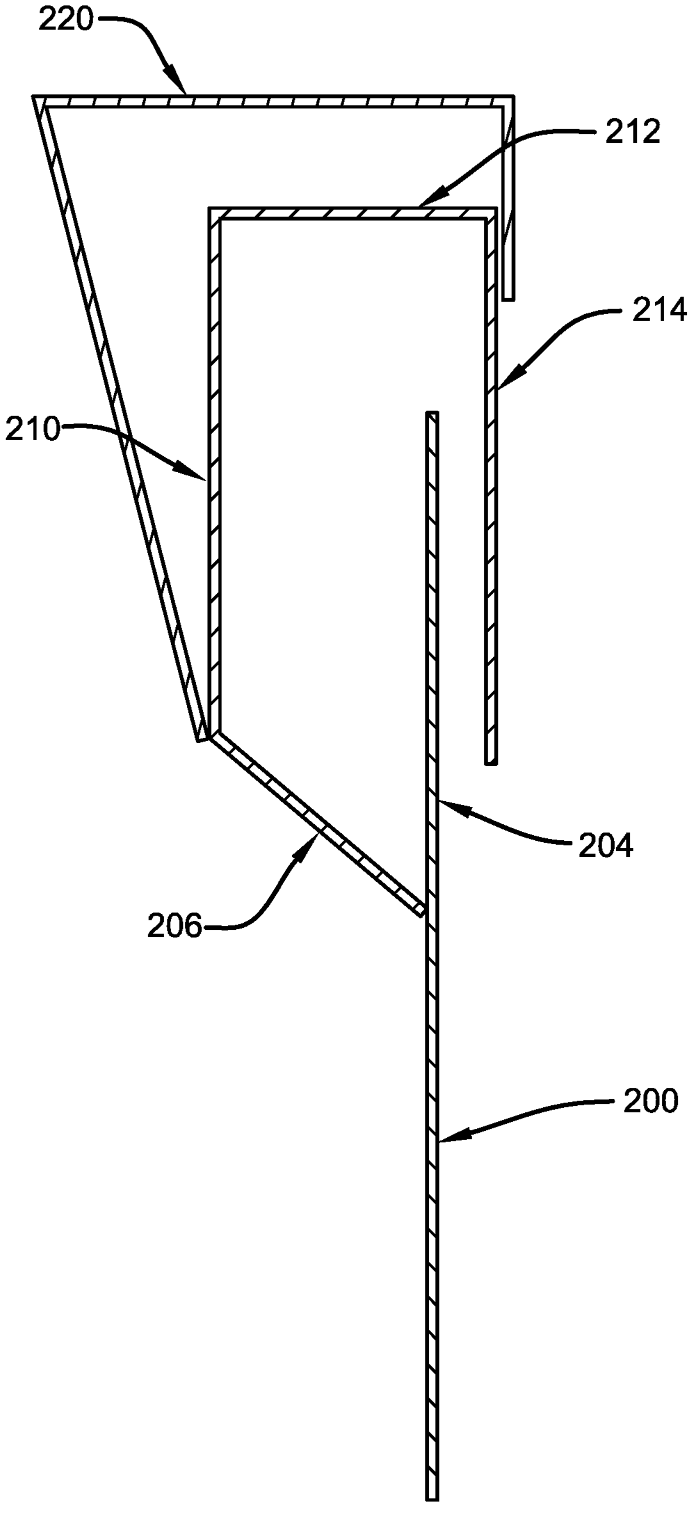
FIG. 12 is a rear view of a side panel, a side panel rail and an extension cap in accordance with another exemplary embodiment of the present disclosure.

Referring to FIG. 12, this figure shows the side panel 200, the side panel rail 206, and the extension cap 220. The extension cap 220 can be positioned over the top surface 212 of the side panel rail 206. The extension cap 220 can be welded or otherwise attached to the side panel rail flange 214, the outer surface 210 of the side panel rail 206, and/or the side panel 200. By using the extension cap 220, a manufacturer can further customize the height of the side panel 220.

In one or more aspects, the body could be assembled via fasteners, such as bolts and nuts, which afford a degree of adjustability, so that the truck body, dump body, or trailer dump body can be customized to a first preferred configuration and then later changed to a second configuration.

Figure 13:
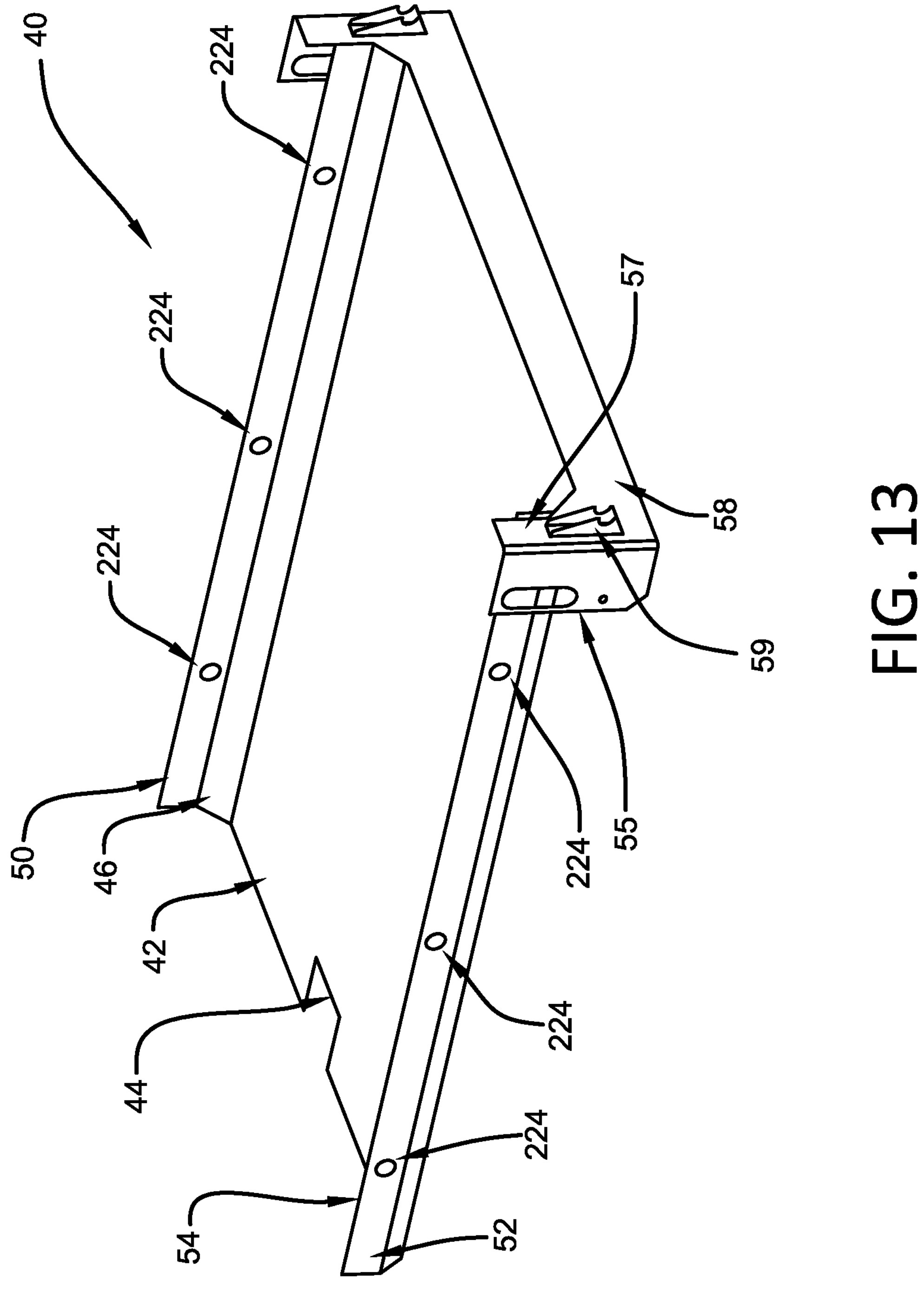
FIG. 13 is a perspective view of a bottom member with apertures for one or more bolts in accordance with an exemplary embodiment of the present disclosure.

Referring to FIG. 13, this figure shows the bottom member 40 with multiple terminal portion apertures 224. It is contemplated herein that the disclosure can only have one terminal portion aperture 224 for each terminal portion 50.

Figure 14:
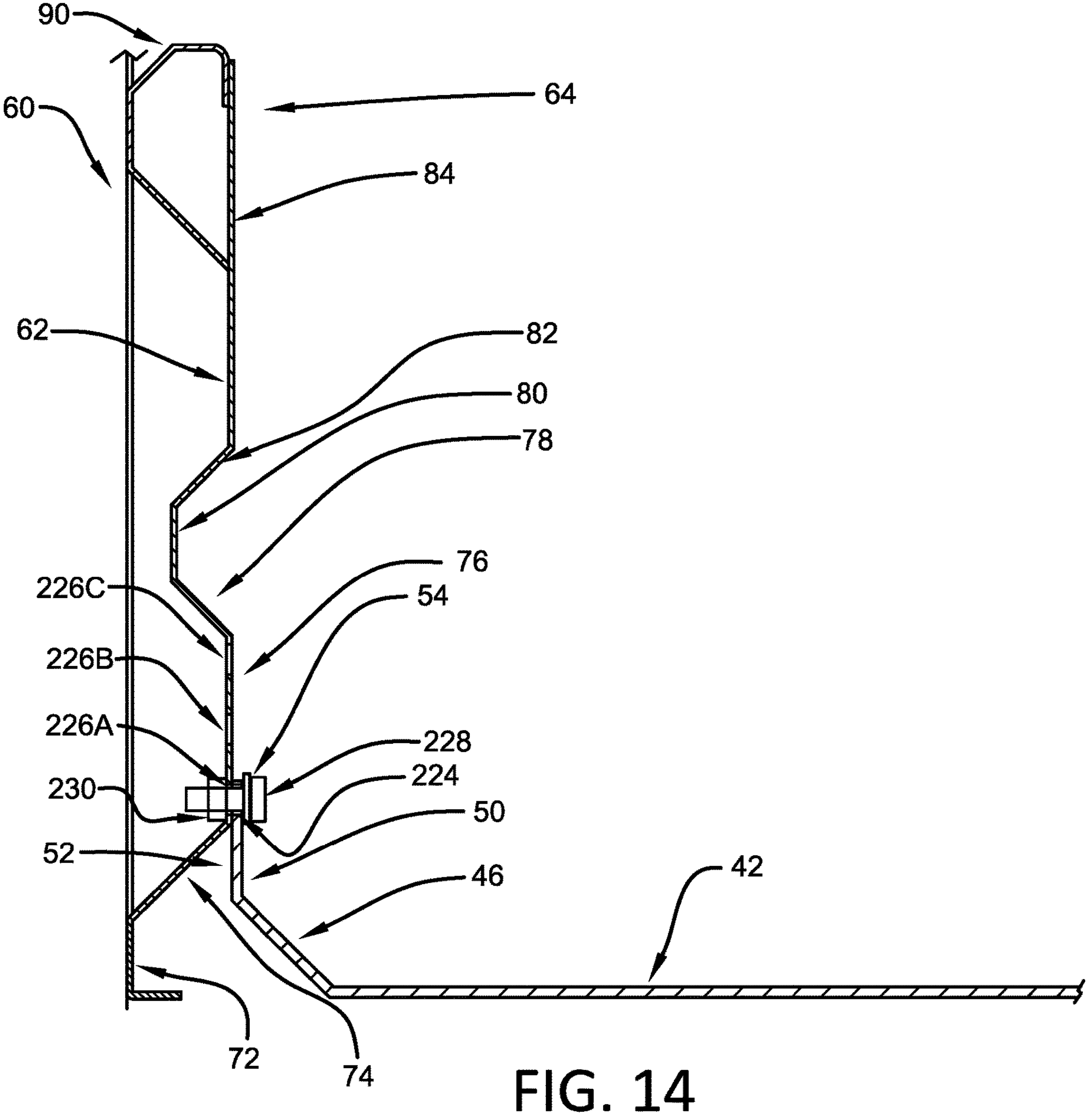
FIG. 14 shows a concentrated view of the connection between the terminal portion and the side panel and where the terminal portion and the side panel at attached via one or more bolts in accordance with an exemplary embodiment of the present disclosure.

Referring to FIG. 14, this figure shows the terminal portion 50 with the terminal portion apertures 224 and the side panel 60 with the side panel apertures 226A, 226B, 226C. The terminal portion 50 can be attached to the mating surface 76 via one or more bolts 228 and nuts 230. When a person attaches the mating surface 76 and the terminal portion 50 at different side panel apertures 226A, 226B, and 226C, the height of the side panel 60 is different. For example, when the bolt 228 is inserted into the side panel aperture 226A, the side panel 60 height can be 42 inches or about 42 inches. When inserted into the side panel aperture 226B, the side panel 60 height can be 36 inches or about 36 inches. And when inserted into the side panel aperture 226C, the side panel 60 height can be 30 inches or about 30 inches. In this manner, the side panel height can be selectively varied based on the placement of the bolts 228 into the respective apertures 226A, 226B, and 226C.

An advantageous aspect of this disclosure is that a person can have the side panel height 60 set to a first custom dimensional design such as 30 inches or about 30 inches via the side panel aperture 226C and then selectively modify the side panel 60 height to a second custom dimensional design such as 36 inches or about 36 inches at a later time by selectively unfastening and refastening one or more bolts 228 and nuts 230 to one of the other side panel apertures. A person does this via the following method: unfastening and removing the bolt 228 and the nut 230 from a first side panel aperture such as the side panel aperture 226A; positioning the side panel 60 to the desired height; and inserting and fastening the bolt 228 and the nut 230 into a second side panel aperture such as the side panel aperture 226B.

Figure 15:
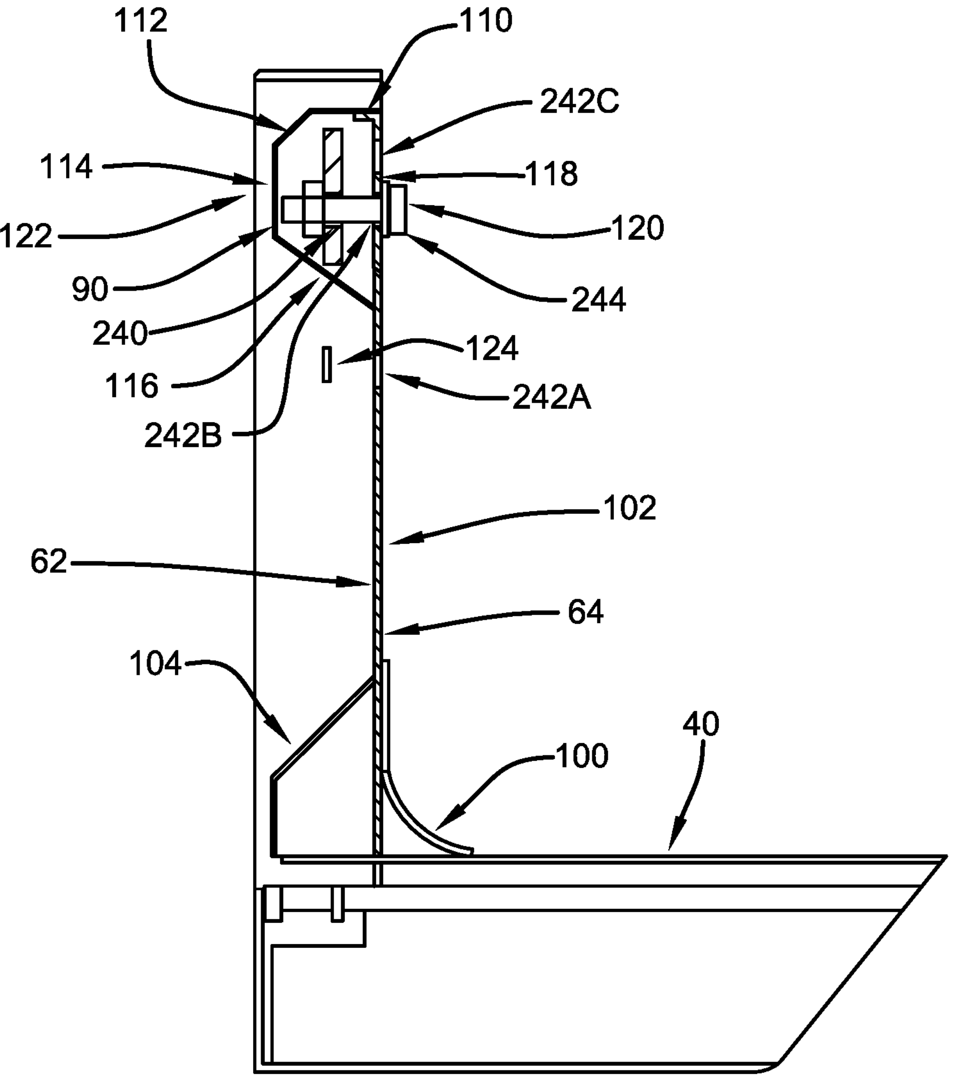
FIG. 15 is a rear view of the side panel where the side panel rail is attached to the side panel via one or more bolts in accordance with an exemplary embodiment of the present disclosure.

Referring to FIG. 15, this figure shows the side panel rail 90 with the side panel rail aperture 240 and the side panel 60 with the side panel apertures 242A, 242B, and 242C. The side panel rail 90 can be attached to the side panel 60 via the bolt 244 and the nut 246. By attaching the side panel rail 90 to one of the side panel apertures 242A, 242B, and 242C, one can customize the height of the side panel from the bottom member 40 to the top of side panel rail 90.

An advantageous aspect of this disclosure is that a person can have the side panel rail 90 height set to a first custom dimensional design such as 36 inches or about 36 inches via the side panel aperture 242C and then modify the side panel rail 90 height to a second custom dimensional design such as 30 inches or about 30 inches by selectively unfastening and refastening one or more bolts 244 and nuts 246 to one of the other side panel apertures such as the side panel aperture 242B. A person does this via the following method: unfastening and removing the bolt 244 and the nut 246 from a first side panel aperture such as the side panel aperture 242C; positioning the side panel rail 90 to the desired height; and inserting and fastening the bolt 244 and the nut 246 into a second side panel aperture such as the side panel aperture 242B.

Figure 16:
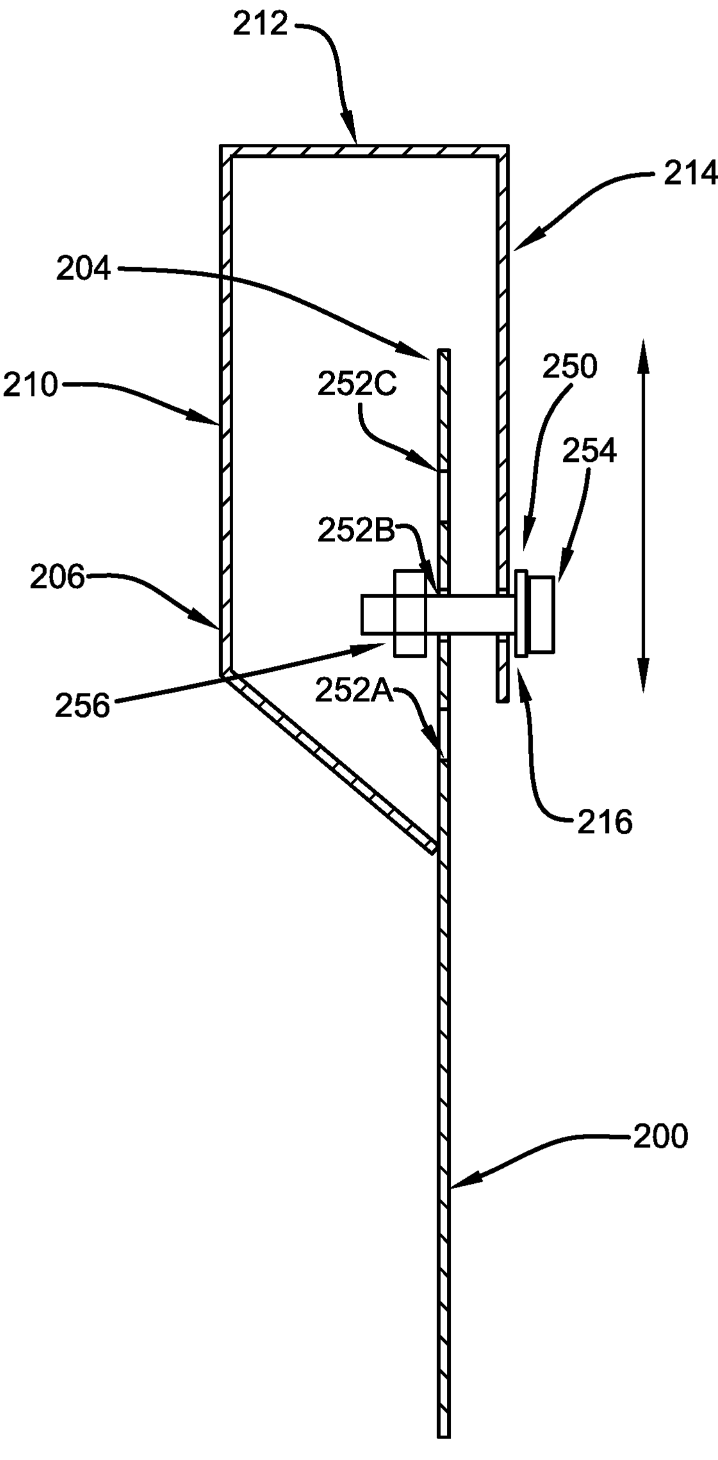
FIG. 16 is a rear view of the side panel and side panel rail where side panel rail is attached to side panel via one or more bolts in accordance with another exemplary embodiment of the present disclosure.

Referring to FIG. 16, this figure shows side panel 200 and side panel rail 206 with side panel apertures 252A, 252B, and 252C. Side panel rail 206 may be attached to side panel 200 via bolt 254 and nut 256. By a person attaching side panel rail 206 to one of side panel apertures 252A, 252B, or 252C, a person can customize the height of the side panel from bottom member 40 to the top of side panel rail 206.

An advantageous aspect of this disclosure is that a person can have the side panel height set to a first custom dimensional design such as 36 inches or about 36 inches via side panel aperture 252C and then modify the side panel 60 height to a second custom dimensional design such as 30 inches or about 30 inches by selectively unfastening and refastening one or more bolts 254 and nuts 256 to one of the other side panel apertures such as the side panel aperture 252B. A person does this via the following method: unfastening and removing the bolt 254 and the nut 256 from a first side panel aperture such as side panel aperture 252C; positioning the side panel rail 206 to the desired height; and inserting and fastening the bolt 254 and the nut 256 into a second side panel aperture such as the side panel aperture 252B.

Numerous embodiments have been described herein. It will be apparent to those skilled in the art that the above methods and apparatuses can incorporate changes and modifications without departing from the general scope of this invention. It is intended to include all such modifications and alterations in so far as they come within the scope of the appended claims or the equivalents thereof.

What is claimed is:

1. A customizable dump body for a vehicle comprising:
- a bottom member defining a horizontal transport surface for retaining material transported within the dump body;
- a bulkhead defining a vertical rear support surface of the dump body;
- first and second side panels defining vertical side support surfaces of the dump body, and attachable to mating surfaces on the bulkhead and the bottom member, wherein the side panels are configured to attach to the mating surfaces at selected positions having a predetermined vertical height above the bottom member, the first and second side panels each including a front post, an inner side, a back post, and a bulkhead side, the front post and back post providing vertical structure of a desired height, to result in a side panel having a suitable size to accommodate a selected custom dump body; and
- a securement for securing the first and second side panels to the bottom member and the bulkhead.

2. The customizable dump body of claim 1, wherein the bottom member comprises a floor panel defining the horizontal transport surface and first and second terminal portions vertically perpendicular to the floor panel, wherein the terminal portions define the mating surfaces for the bottom member that receive the securement for securing the first and second side panels.

3. The customizable dump body of claim 2, further comprising first and second acute portions, each secured at an angle between both the floor panel and each respective terminal portion.

4. The customizable dump body of claim 1, wherein the at least one of the side panels has a shape configured for being welded to the respective terminal portion and comprises an inner side including a plurality of surfaces set at angles to each other to provide mechanical strength to the side panel.

5. The customizable dump body of claim 4, wherein the inner side includes a first angled surface set at a sloped angle to a flat mating surface, and a second angled surface set an angle opposite to the first angled surface on an opposite side of the mating surface, wherein a channel is formed in an inner surface defined by the second angled surface, a channel bottom surface parallel to the mating surface, and a third angled surface parallel to the first angled surface.

6. The customizable dump body of claim 4, wherein the side panel further comprises an outer side including a side panel rail having a generally flat top surface and a chamfer set at an angle to the top surface, wherein the top surface and the chamfer are configured so that material that falls on the side panel rail thereby falls outside of the dump body.

7. The customizable dump body of claim 6, wherein the side panel is configured such that the side panel rail comprises a top of the side panel and is positioned at a vertically selectable lower or higher position to establish the predetermined vertical height of the mating surfaces above the bottom member.

8. The customizable dump body of claim 7, wherein the side panel rail is positioned so that a distance between the bottom member and the side panel rail is between 30 inches and 36 inches.

9. The customizable dump body of claim 6, wherein the side panel rail further comprises a side panel rail flange for overlapping the side panel to selectively position the side panel rail at a predetermined vertical height along the side panel, and further comprising a side panel rail securement for securing the side panel rail flange to the side panel.

10. The customizable dump body of claim 6, further comprising an extension cap positioned over a top surface of the side panel rail to customize a height of the side panel.

11. The customizable dump body of claim 1, wherein the bottom member further comprises a plurality of terminal portion apertures formed on the mating surfaces, and wherein the side panels each comprise a plurality of side panel apertures spaced at different heights, wherein the terminal portion apertures are attached with the securement to respective side panel apertures at a respective corresponding height.

12. The customizable dump body of claim 11, wherein the plurality of side panel apertures comprises first, second, and third side panel apertures associated with respective first, second, and third corresponding heights.

13. The customizable dump body of claim 12, wherein the first side panel apertures are associated with a respective first height of 42 inches, the second side panel apertures are associated with a respective second height of 36 inches, and the third side panel apertures are associated with a respective third height of 30 inches.

14. The customizable dump body of claim 1, further comprising at least one frame component upon which the dump body is secured to the vehicle.

15. The customizable dump body of claim 1, wherein the securement comprises one of a plurality of welds or a plurality or nut and bolt fasteners.

16. A method of customizing a dump body for a vehicle, comprising steps of:
- providing a bottom member defining a horizontal transport surface for retaining material transported within the dump body, a bulkhead defining a vertical rear support surface of the dump body, and first and second side panels defining vertical side support surfaces of the dump body, the first and second side panels each including a front post, an inner side, a back post, and a bulkhead side, the front post and back post providing vertical structure of a desired height, to result in a side panel having a suitable size to accommodate a selected custom dump body;
- positioning the side panels up or down until a desired height for the side panels with respect to the bottom member is reached; and
- securing the side panels to the bottom member resulting in a dump body having side panels positioned at the desired height.

17. The method of claim 16, wherein the step of securing comprises one of welding the side panels or fastening the side panels with nuts and bolts.

* * * * *